(12) United States Patent
Rabal

(10) Patent No.: US 7,134,293 B2
(45) Date of Patent: Nov. 14, 2006

(54) SYSTEM, AND ASSOCIATED METHOD, FOR COOLING AND AERATING A LIVE WELL

(75) Inventor: Clifford R. Rabal, Wills Point, TX (US)

(73) Assignee: R&R Design, Inc., Terrell, TX (US)

( * ) Notice: Subject to any disclaimer, the term of this patent is extended or adjusted under 35 U.S.C. 154(b) by 276 days.

(21) Appl. No.: 10/783,388

(22) Filed: Feb. 20, 2004

(65) Prior Publication Data

US 2005/0183431 A1    Aug. 25, 2005

(51) Int. Cl.
*F25D 17/02* (2006.01)
*F25D 19/00* (2006.01)
*F25B 21/02* (2006.01)
*A01K 97/00* (2006.01)

(52) U.S. Cl. ............................. 62/185; 62/455; 62/3.2; 62/3.3

(58) Field of Classification Search ............... 62/185, 62/455, 3.2, 3.6, 3.3, 3.7; 43/55, 57
See application file for complete search history.

(56) References Cited

U.S. PATENT DOCUMENTS

| | | | | |
|---|---|---|---|---|
| 4,748,765 A | * | 6/1988 | Martin | 43/55 |
| 6,044,901 A | * | 4/2000 | Basala | 165/122 |
| 6,564,010 B1 | * | 5/2003 | Huang et al. | 392/465 |
| 6,962,019 B1 | * | 11/2005 | McDougle | 43/57 |
| 2002/0168276 A1 | * | 11/2002 | Huang | 417/420 |

* cited by examiner

*Primary Examiner*—Chen Wen Jiang
(74) *Attorney, Agent, or Firm*—Jack D. Stone, Jr.

(57) ABSTRACT

An apparatus for cooling a live well includes a cooling chamber, and a pump connected in fluid communication between the cooling chamber and the live well for circulating water between the live well and the cooling chamber. At least one thermoelectric cooler is positioned in a heat exchange relationship with the cooling chamber for removing heat from the cooling chamber and from water circulating in the cooling chamber.

26 Claims, 2 Drawing Sheets

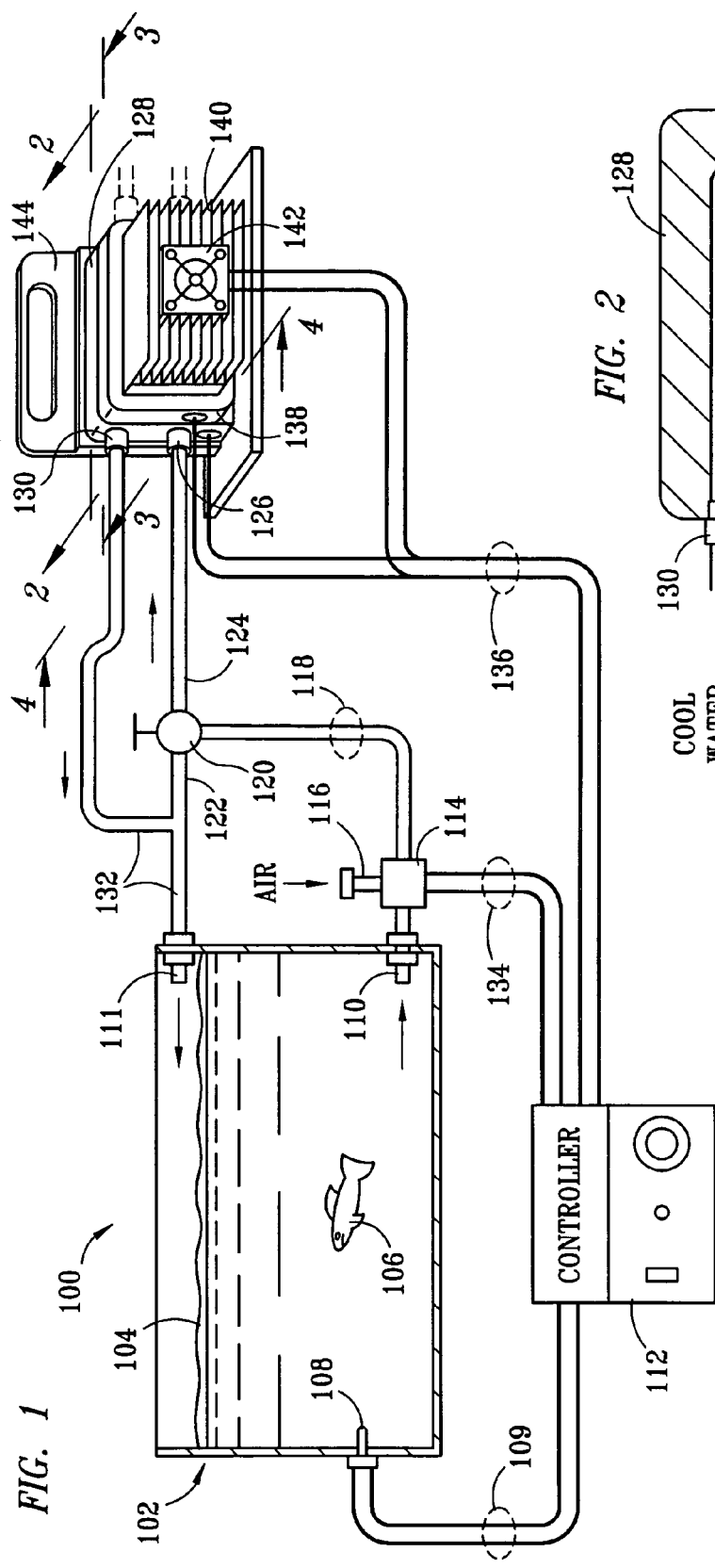
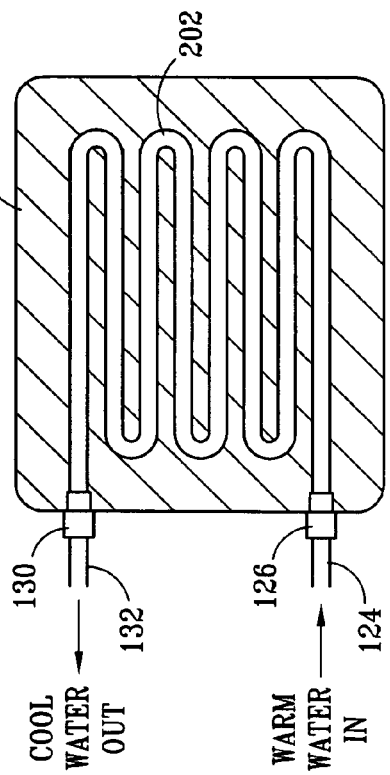
FIG. 1
FIG. 2

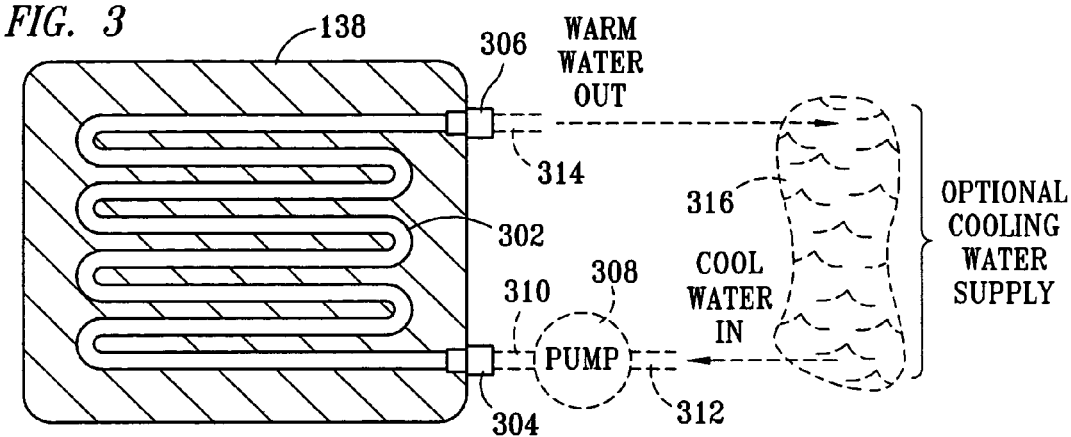
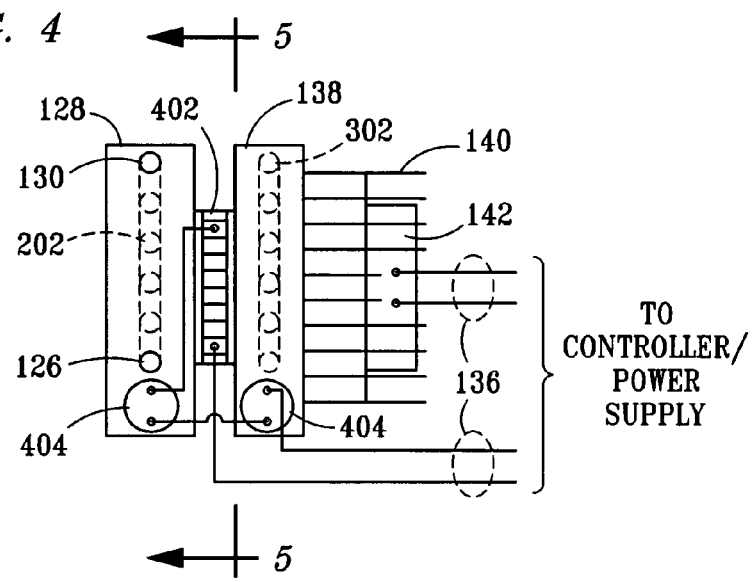
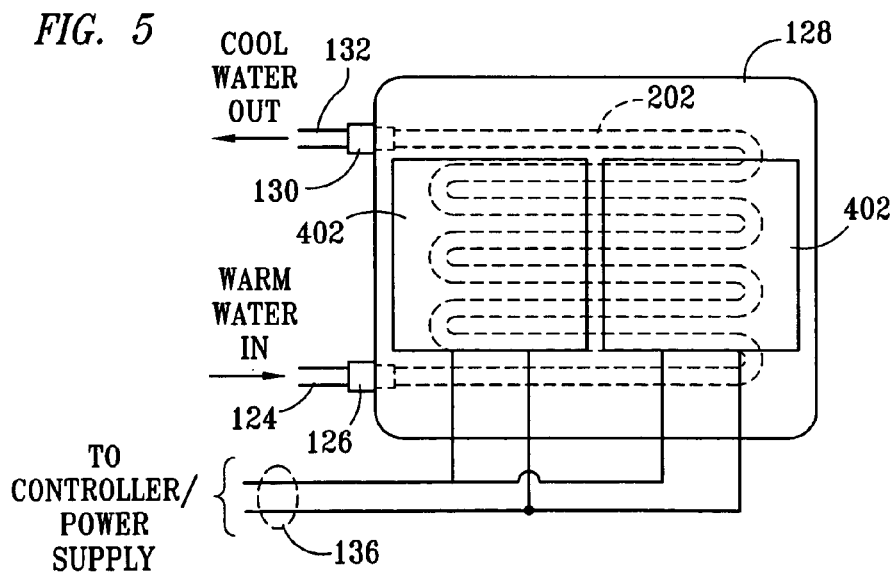

SYSTEM, AND ASSOCIATED METHOD, FOR COOLING AND AERATING A LIVE WELL

TECHNICAL FIELD

The invention relates generally to live wells used for preserving the health of fish and, more particularly, to an apparatus and associated method for cooling and aerating (i.e., oxygenating) a live well for preserving the health of fish.

BACKGROUND

Fishing is a popular sport for many people. Frequently, people who catch fish (also known as "fishermen," used herein to refer collectively to women who fish as well) desire to preserve fish alive and healthy until they have finished fishing, for example, upon completion of a fishing expedition or competition. Conventionally, once fish are caught, they are preserved for a period of time in a "live well," which is similar to an aquarium, but is filled with water drawn from the area, such as a lake or river, from which such fish was caught.

A live well is effective for keeping fish alive and healthy for a period of time longer than would be possible if a fish were, for example, laid out on the deck of a boat without water. However, the period of time that a fish may remain alive in a live well is limited, and often results in such fish not surviving until the end of a fishing expedition. The reason fish do not fare well in a live well is two-fold. First, the temperature of water in a live well is often warmer than the temperature of water from which fish are caught, potentially creating thermal shock to a fish. Since fish are cold-blooded, they cannot long withstand such thermal shock or survive in such elevated temperatures. A second reason that fish often do not survive in live wells is that the water in the live well is not adequately aerated. Thus, fish cannot obtain sufficient oxygen needed to sustain life. Thus, the combination of sudden and sustained heat together with a lack of oxygen substantially shorten the life and diminish the health of a fish in a live well.

Thus, there is a need for an apparatus and associated method for preserving fish alive and healthy for a longer period of time after they are caught than what is currently possible using conventional technology.

SUMMARY

The present invention, accordingly, provides an apparatus for cooling a live well. The apparatus of the invention includes a cooling chamber and a pump connected in fluid communication between the cooling chamber and the live well for circulating water between the cooling chamber and the live well. At least one thermoelectric cooler is arranged in a heat exchange relationship with the cooling chamber for removing heat from the cooling chamber and from water circulating in the cooling chamber.

In an additional aspect of the invention, the pump is configured to receive air and mix the air with the water that it pumps to the cooling chamber, to thereby aerate (i.e., oxygenate) the water. To further aerate the water, the water is preferably injected back into the water in the live well above the top of the water so that the water passes through the air prior to re-entry into the live well.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic view of a live well apparatus embodying features of the present invention;

FIG. 2 is a cross-sectional view of a cooling chamber of FIG. 1 taken along the line 2—2 of FIG. 1;

FIG. 3 is a cross-sectional view of a water jacket of FIG. 1 taken along the line 3—3 of FIG. 1;

FIG. 4 shows a side view of a heat exchanger of FIG. 1 viewed according to the line 4—4 of FIG. 1; and FIG. 5 is a cross-sectional view of the heat exchanger of FIG. 4 taken along the line 5—5 of FIG. 4.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning fish, live wells, and the like have been omitted inasmuch as such details are not considered necessary to obtain a complete understanding of the present invention, and are considered to be within the skills of persons of ordinary skill in the relevant art.

Referring to FIG. 1 of the drawings, the reference numeral 100 generally designates a live well system, embodying features of the present invention. The live well system 100 includes a live well 102 containing water 104 and one or more fish, exemplified in FIG. 1 as a single fish 106. The water 104 preferably comprises water drawn from the same body of water (e.g., lake, river, ocean, or the like, shown in FIG. 3) from which the fish 106 was caught. The live well 102 is generally similar to a conventional live well, but for the addition of a thermal sensor 108, an outlet port 110, and an inlet port 111.

The thermal sensor 108 is electrically coupled via wires 109 to a controller 112, operable in a manner described in further detail below. The outlet port 110 is coupled in fluid communication to a recirculation pump 114 configured for drawing water 104 from the live well 102 and pumping it through a first warm water line (e.g., hose, tube, or the like) 118, as described in further detail below. The pump 114 preferably includes an air inlet 116 through which ambient air is drawn, and the pump is configured for mixing, for example via a venturi, the ambient air with the water 104 received from the live well 102, to thereby aerate (i.e., oxygenate) the water. The controller 112 is electrically coupled via wires 134 to the pump 114 for activating and deactivating operation of the pump.

The pump 114 is connected to a first warm water line 118 through which the aerated water is pumped from the pump 114. The line 118 is preferably connected to a three-way valve 120 configured for controlling the proportion of water which flows outwardly through a bypass line 122 and through a second portion of the warm water line 124. The second portion of the warm water line 124 is configured for carrying water from the three-way valve 120 to an inlet port 126 of a cooling chamber 128, described in further detail below. The cooling chamber 128 includes an outlet port 130 connected to a cool water line 132 configured for carrying water from the cooling chamber 128 to the inlet port 111 of the live well 102. The inlet port 111 is preferably positioned above the top of the water 104 for injecting water through the air above, and then into, the water 104, to thereby further aerate the water.

As described in further detail below, one or more thermoelectric coolers (TEC's, not shown in FIG. 1) are positioned on the cooling chamber 128, and a water jacket 138 (described in further detail below) is preferably positioned on the one or more TEC's. A heat sink comprising a plurality of fins 140, and at least one fan 142 positioned within the fins 140, is preferably positioned on the water jacket 138 for cooling the water jacket 138. While the fins 140 are depicted in FIG. 1 as being oriented horizontally, they may also be oriented vertically. The controller 112 is electrically coupled via wires 136 to the one or more TEC's and to the fan 142 for activating and deactivating the operation of the TEC's and the fan, in a manner described in further detail below. Alternatively, rather than controlling operation of the TEC's and the fan 142 via the same wires 136, one set of wires may be run from the controller 112 to the TEC's, and another set of wires may be run from the controller 112 to the fan 142, so that the controller 112 may separately control the operation of the TEC's and the fan 142.

It is noted that the combination of the cooling chamber 128, the water jacket 138, TEC's, and associated components (e.g., fan 142 and fins 140) are preferably assembled as an integrated unit, referred to as a heat exchange unit. To facilitate portability of the heat exchange unit, a handle 144 is provided, preferably attached to the cooling chamber 128, though it may be attached to any portion of the unit.

FIG. 2 depicts a cross-section of the cooling chamber 128 taken along the line 2—2 of FIG. 1. As shown therein, the cooling chamber 128 preferably comprises a substantially serpentine fluid passageway 202 formed in a block of material, such as aluminum, steel, or the like, effective for conducting heat. The serpentine fluid passageway 202 defines a centerline that preferably runs in a substantially planar path, and is configured for carrying fluid (e.g., water) from the inlet port 126 to the outlet port 130.

FIG. 3 depicts a cross-section of the water jacket 138 taken along the line 3—3 of FIG. 1. As shown therein, the water jacket 138 preferably comprises a substantially serpentine fluid passageway 302 formed in a block of material, such as aluminum, steel, or the like, effective for conducting heat. The serpentine fluid passageway 302 defines a centerline that preferably runs in a substantially planar path, and is configured for carrying fluid (e.g., water) from an inlet port 304 to an outlet port 306. A pump 308 is preferably coupled via a line 310 to the inlet port 304, and via a line 312 to a body of water 316 from which fish would be retrieved, for drawing water from the body of water 316 and directing the water to the inlet port 304 for flow through the fluid passageway 302 to the outlet port 306 and through a line 314 back to the body of water 316. It is understood that the water jacket 138 may be configured so that the inlet port 304 and outlet port 306 are on either side of the water jacket 138, that is, the inlet and outlet ports of the water jacket 138 may be on the same side as the inlet and outlet ports 126 and 130 of the cooling chamber 128, or alternatively, anywhere else on the water jacket 138.

FIG. 4 shows a side view of the cooling chamber 128 and water jacket 138 viewed according to the line 4—4 of FIG. 1. As viewed therein, one of two TEC's 402 is shown "sandwiched" between the cooling chamber 128 and the water jacket 138, and is powered and controlled by the controller 112 via the wires 136. The TEC 402 is preferably a single-stage TEC, though multi-stage TEC's may be used, and any number of TEC's may be utilized as suitable to cool the cooling chamber 128. Furthermore, each TEC 402 is, by way of example but not limitation, preferably sized to draw about 3 to 4 amperes or electrical power at about 12 volts. The TEC 402 is positioned so that the cool side of the TEC 402 abuts the cooling chamber 128, and the warm side of the TEC 402 abuts the water jacket 138, so that heat is transferred by the TEC from the cooling chamber 128 to the water jacket 138. TEC's are considered to be well-known in the art and, therefore, are not described in further detail herein.

Each of the cooling chamber 128 and the water jacket 138 further preferably include a thermo disk fuse 404 appended thereto for providing thermal protection by sensing the temperature of the cooling chamber 128 and water jacket 138 and, if the temperature of either unit overheats, then power via the wires 136 is turned off, thereby preferably deactivating the operation of both the TEC's 402 and the fan 142.

FIG. 5 shows a front view of both TEC's 402, taken along the line 5—5 of FIG. 4, positioned on the cooling chamber 128.

In operation, with water 104 in the live well 102 and power applied to the controller 112, the thermal sensor 108 is powered up and generates a signal to the controller 112 indicative of the temperature of the water 104 contained within the live well 102. The controller 112 then makes a determination whether the temperature of the water is above a predetermined upper temperature, such as 85°, or is below a predetermined lower temperature, such as 75°, it being understood that all temperatures given herein are in Fahrenheit, and are provided by way of example and not limitation. If the water temperature is above the predetermined upper temperature, then power is applied to the TEC's 402 and fan 142, and a temperature gradient is allowed to develop across the TEC's such that the cooling chamber 128 is cooled. A predetermined period of time, such as about one minute (though the time may vary more or less than one minute), is preferably allowed to elapse so that the TEC's 402 and cooling chamber 128 may be cooled somewhat before warm water 104 begins flowing through the fluid passageway 202 and warms the cooling chamber 128. Once the TEC's 402 have been allowed to cool down the cooling chamber 128, then the controller 112 activates the pump 114 to pump water 104 from the live well 102 through the lines 118, the valve 120, the line 124, and the inlet port 126 to the cooling chamber 128 for flow through the fluid passageway 202. As the water 104 flows through the passageway 202, the water is cooled down and then passes through the outlet port 130 and the line 132 to the inlet port 111 of the live well 102. The inlet port 111 is preferably positioned above the top of the water 104 of the live well 102 so that the water injected into the live well 102 is further aerated before it actually re-enters the water 104 in the live well.

The controller 112 continues to monitor the temperature of the water 104 in the live well 104 after the one or more TEC's 402 and fan 142 have been activated. If the temperature falls below the predetermined lower temperature, then the pump 114, the TEC's 402, and the fan 142 are deactivated. The temperature of the water 104 is then monitored for rising above the predetermined upper temperature, and the temperature of the water continues to be adjusted as needed to maintain the water 104 at a temperature that is suitable for keeping fish alive in the live well 102, preferably in a temperature range between the predetermined lower temperature and the predetermined upper temperature.

Optionally, if the line 312 (FIG. 3) is positioned to draw water from the body of water 316 in which fish are caught from, and the line 314 is positioned to dispose of water in the same body of water 316, then in the foregoing description of the operation of the invention, when the TEC's 402 and fan 142 are activated and deactivated, the pump 308 is preferably also activated and deactivated, respectively.

It is understood that the present invention may take many forms and embodiments. Accordingly, several variations may be made in the foregoing without departing from the spirit or the scope of the invention. For example, the valve 120 may be controlled by the controller 112, and the pump 114 allowed to operate continuously, so that, for example, when the water 104 is not being cooled it may continue to be aerated. The inlet port 111 may be provided with an aerator nozzle to further aerate (i.e., oxygenate) re-circulated water before it re-enters the water 104. One or two of the water jacket 138, fins 140, and/or fan 142 may be positioned on one side of the cooling chamber 128, and the remaining one or two of the water jacket 138, fins 140, and/or fan 142 may be positioned on the opposing side of the cooling chamber 128. An additional water jacket, fins, and/or fan may be provided so that at least one water jacket, fins, and/or fan are positioned on each side of the cooling chamber 128. The water jacket 138, fins 142, and/or fan 142 may alternatively be omitted from the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed in:

1. A system for cooling a live well, said system comprising:
    a cooling chamber;
    a pump connected in fluid communication between said cooling chamber and said live well for circulating water between said cooling chamber and said live well;
    at least one thermoelectric cooler positioned in a heat exchange relationship with said cooling chamber for removing heat from said cooling chamber and from water circulating in said cooling chamber;
    a temperature sensor positioned for sensing the temperature of water in said live well and for generating a temperature signal indicative of said temperature; and
    a controller connected to said temperature sensor for receiving said temperature signal, said controller being further connected to said pump and said at least one thermoelectric cooler for controlling operation of said pump and said at least one thermoelectric cooler, said controller being configured for activating said at least one thermoelectric cooler when said temperature signal indicates that the temperature of said water in said live well is above a predetermined upper temperature, for activating said pump a predetermined period of time subsequent to activation of said at least one thermoelectric cooler, and for deactivating said pump and said at least one thermoelectric cooler when said temperature signal indicates that the temperature of said water in said live well is below a predetermined lower temperature.

2. The system of claim 1, further comprising an air inlet in said pump for permitting ambient air to enter and aerate said water.

3. The system of claim 1, further comprising at least one fan positioned in a heat exchange relationship with said at least one thermoelectric cooler for transferring heat away from said at least one thermoelectric cooler to ambient air.

4. The system of claim 1, further comprising at least one fin positioned in a heat exchange relationship with said at least one thermoelectric cooler for transferring heat away from said at least one thermoelectric cooler to ambient air.

5. The system of claim 1, further comprising at least one fan and at least one fin positioned in a heat exchange relationship with said at least one thermoelectric cooler for transferring heat away from said at least one thermoelectric cooler to ambient air.

6. The system of claim 1, wherein said cooling chamber further comprises an inlet port for receiving water from said live well, and an outlet port for passing water back to said live well, said apparatus further comprising:
    a warm water line coupled between said pump and said inlet port for providing fluid communication between said pump and said inlet port;
    a cool water line coupled between said outlet port and said live well for providing fluid communication between said outlet port and said live well;
    a bypass line coupled between said warm water line and said cool water line for facilitating fluid communication of water between said warm water line and said cool water line, so that said water bypasses said cooling chamber; and
    a valve positioned on said bypass line for controlling the flow of water through said bypass line.

7. The system of claim 1, wherein said first passageway further comprises an inlet port for receiving water from said live well, and an outlet port for passing water back to said live well, said apparatus further comprising:
    a warm water line coupled between said pump and said inlet port for providing fluid communication between said pump and said inlet port;
    a cool water line coupled between said outlet port and said live well for providing fluid communication between said outlet port and said live well;
    a bypass line coupled between said warm water line and said cool water line for facilitating fluid communication of water between said warm water line and said cool water line, so that said water bypasses said cooling chamber; and
    a three-way valve positioned between said bypass line and said warm water line for controlling the proportion of water that flows through said bypass line and through said warm water line between said bypass valve and said inlet port.

8. The system of claim 1, wherein said live well further comprises an outlet port through which water is drawn, and an inlet port through which water is received; wherein said cooling chamber further comprises an inlet port coupled to said outlet port of said live well for receiving water from said live well, and an outlet port coupled to said inlet port of said live well for transmitting water to said live well; wherein a top of water level is defined in said live well; and wherein said inlet port of said live well is positioned above said top of water level for facilitating aeration of said water.

9. The system of claim 1, wherein said pump is a first pump, and said system further comprises:
a water jacket positioned in a heat exchange relationship with said at least one thermoelectric cooler for receiving heat from said at least one thermoelectric cooler; and
a second pump connected in fluid communication between said water jacket and a body of water for circulating water between said water jacket and said body of water.

10. The system of claim 1, wherein said pump is a first pump, and said system further comprises:
a water jacket positioned in a heat exchange relationship with said at least one thermoelectric cooler for receiving heat from said at least one thermoelectric cooler;
a second pump connected in fluid communication between said water jacket and a body of water for circulating water between said water jacket and said body of water; and
at least one fan positioned in a heat exchange relationship with said water jacket for transferring heat away from said water jacket to ambient air.

11. The system of claim 1, wherein said pump is a first pump, and said system further comprises:
a water jacket positioned in a heat exchange relationship with said at least one thermoelectric cooler for receiving heat from said at least one thermoelectric cooler;
a second pump connected in fluid communication between said water jacket and a body of water for circulating water between said water jacket and said body of water; and
at least one fin positioned in a heat exchange relationship with said water jacket for transferring heat away from said water jacket to ambient air.

12. The system of claim 1, wherein said pump is a first pump, and said system further comprises:
a water jacket positioned in a heat exchange relationship with said at least one thermoelectric cooler for receiving heat from said at least one thermoelectric cooler;
a second pump connected in fluid communication between said water jacket and a body of water for circulating water between said water jacket and said body of water; and
at least one fan and at least one fin positioned in a heat exchange relationship with said water jacket for transferring heat away from said water jacket to ambient air.

13. The system of claim 1, wherein said pump is a first pump, and said system further comprises:
a water jacket positioned in a heat exchange relationship with said at least one thermoelectric cooler for receiving heat from said at least one thermoelectric cooler;
a second pump connected in fluid communication between said water jacket and a body of water for circulating water between said water jacket and said body of water; and
said controller being further connected to said second pump for controlling operation of said second pump, said controller being configured for activating said second pump when said temperature signal indicates that the temperature of said water in said live well is above a predetermined upper temperature, and for deactivating said second pump when said temperature signal indicates that the temperature of said water in said live well is below a predetermined lower temperature.

14. A method for cooling a live well, said method comprising steps of:
circulating water between said live well and a cooling chamber;
activating at least one thermoelectric cooler positioned in a heat exchange relationship with said cooling chamber for removing heat from said cooling chamber and from water circulating in said cooling chamber;
sensing the temperature of water in said live well and generating a temperature signal indicative of said temperature;
activating said at least one thermoelectric cooler when said temperature signal indicates that the temperature of said water in said live well is above a predetermined upper temperature;
circulating said water beginning at a predetermined amount of time subsequent to the step of activating said at least one thermoelectric cooler; and
deactivating said at least one thermoelectric cooler and discontinuing said step of circulating said water when said temperature signal indicates that the temperature of said water in said live well falls below a predetermined lower temperature.

15. The method of claim 14, further comprising the step of aerating said water with ambient air drawn through an air inlet in a pump utilized for circulating said water.

16. The method of claim 14, further comprising the step of positioning at least one fan in a heat exchange relationship with said at least one thermoelectric cooler for transferring heat away from said at least one thermoelectric cooler to ambient air.

17. The method of claim 14, further comprising the step of positioning at least one fin in a heat exchange relationship with said at least one thermoelectric cooler for transferring heat away from said at least one thermoelectric cooler to ambient air.

18. The method of claim 14, further comprising the step of positioning at least one fan and at least one fin in a heat exchange relationship with said at least one thermoelectric cooler for transferring heat away from said at least one thermoelectric cooler to ambient air.

19. The method of claim 14, further comprising the step of directing at least a portion of said water to bypass said cooling chamber.

20. The method of claim 14, wherein said step of circulating said water further comprises passing said water through ambient air to thereby aerate said water prior to re-entry by said water into said live well.

21. The method of claim 14, further comprising steps of:
transferring heat from said at least one thermoelectric cooler to a water jacket positioned in a heat exchange relationship with said at least one thermoelectric cooler; and
circulating water between said water jacket and a body of water.

22. The method of claim 14, further comprising steps of:
transferring heat from said at least one thermoelectric cooler to a water jacket positioned in a heat exchange relationship with said at least one thermoelectric cooler;
circulating water between said water jacket and a body of water; and
positioning at least one fan in a heat exchange relationship with said water jacket for transferring heat away from said water jacket to ambient air.

23. The method of claim 14, further comprising steps of:
transferring heat from said at least one thermoelectric cooler to a water jacket positioned in a heat exchange relationship with said at least one thermoelectric cooler;
circulating water between said water jacket and a body of water; and
positioning at least one fin in a heat exchange relationship with said water jacket for transferring heat away from said water jacket to ambient air.

24. The method of claim 14, further comprising steps of:
transferring heat from said at least one thermoelectric cooler to a water jacket positioned in a heat exchange relationship with said at least one thermoelectric cooler;
circulating water between said water jacket and a body of water; and
positioning at least one fan and at least one fin in a heat exchange relationship with said water jacket for transferring heat away from said water jacket to ambient air.

25. The method of claim 14, further comprising steps of:
positioning a water jacket in a heat exchange relationship with said at least one thermoelectric cooler for transferring heat away from said at least one thermoelectric cooler to said water jacket;
circulating water between said live well and said cooling chamber, and circulating water between said water jacket and a body of water when said temperature signal indicates that the temperature of said water in said live well is above a predetermined upper temperature; and
discontinuing said steps of circulating water between said live well and said cooling chamber, and circulating water between said water jacket and a body of water, when said temperature signal indicates that the temperature of said water in said live well falls below a predetermined lower temperature.

26. The method of claim 14, further comprising steps of:
positioning a water jacket in a heat exchange relationship with said at least one thermoelectric cooler for transferring heat away from said at least one thermoelectric cooler to said water jacket;
circulating water between said live well and said cooling chamber and circulating water between said water jacket and a body of water, beginning a predetermined period of time subsequent to activation of said at least one thermoelectric cooler; and
discontinuing said steps of circulating water between said live well and said cooling chamber, and circulating water between said water jacket and a body of water, when said temperature signal indicates that the temperature of said water in said live well falls below a predetermined lower temperature.

* * * * *